US009797736B2

(12) United States Patent
Goto et al.

(10) Patent No.: US 9,797,736 B2
(45) Date of Patent: Oct. 24, 2017

(54) DRIVE ASSIST SYSTEM, METHOD, AND PROGRAM

(71) Applicant: AISIN AW CO., LTD., Anjo-shi, Aichi-ken (JP)

(72) Inventors: Hirohiko Goto, Chiryu (JP); Masatoshi Takahara, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/911,432

(22) PCT Filed: Jun. 24, 2014

(86) PCT No.: PCT/JP2014/066672
§ 371 (c)(1),
(2) Date: Feb. 10, 2016

(87) PCT Pub. No.: WO2015/029565
PCT Pub. Date: Mar. 5, 2015

(65) Prior Publication Data
US 2016/0187149 A1 Jun. 30, 2016

(30) Foreign Application Priority Data

Aug. 28, 2013 (JP) ................. 2013-176313

(51) Int. Cl.
*G01C 21/34* (2006.01)
*B60W 50/14* (2012.01)
(Continued)

(52) U.S. Cl.
CPC ............. *G01C 21/34* (2013.01); *B60W 50/14* (2013.01); *G01C 21/26* (2013.01);
(Continued)

(58) Field of Classification Search
CPC .... G01C 21/26; G01C 21/34; G01C 21/3626; B60W 50/14; G08G 1/0112; G08G 1/0129

See application file for complete search history.

(56) References Cited

FOREIGN PATENT DOCUMENTS

JP 2009104531 A 5/2009
JP 2010256272 A 11/2010
(Continued)

OTHER PUBLICATIONS

Jul. 22, 2014 International Search Report issued in International Patent Application No. PCT/JP2014/066672.

*Primary Examiner* — Aaron L Troost
(74) *Attorney, Agent, or Firm* — Oliff PLC

(57) ABSTRACT

Drive assist systems, methods, and programs acquire a stored guide location where guidance associated with a guide event as a guide target will be provided, acquire event information indicating whether the guide event was detected from a vehicle that can selectively provide or not provide guidance associated with the guide event and which is set to provide guidance, and which detected the guide event at the guide location. The systems, methods, and programs determine whether to stop providing guidance for the guide event at the guide location based on the event information, correct stored information to stop providing guidance for the guide event at the guide location when it is determined to stop providing guidance, and acquire and transmit to the vehicle information indicating the guide location for which provision of guidance associated with the guide event has not been stopped and the guide event from the storage medium.

8 Claims, 5 Drawing Sheets

(51) Int. Cl.
*G01C 21/26* (2006.01)
*G01C 21/36* (2006.01)
*G08G 1/01* (2006.01)

(52) U.S. Cl.
CPC ....... *G01C 21/3626* (2013.01); *G08G 1/0112* (2013.01); *G08G 1/0129* (2013.01)

(56) References Cited

FOREIGN PATENT DOCUMENTS

| | | | |
|---|---|---|---|
| JP | 2011107978 | A | 6/2011 |
| JP | 2012008969 | A | 1/2012 |
| JP | 2013003043 | A | 1/2013 |

DRIVE ASSIST SYSTEM, METHOD, AND PROGRAM

TECHNICAL FIELD

Related technological fields include technologies for setting a guide target on the basis of a travel history of a vehicle.

BACKGROUND ART

There has hitherto been known a technology for acquiring travel history of a plurality of vehicles and statistically analyzing the travel history to specify a location that needs attention during travel etc. For example, Japanese Patent Application Publication No. 2009-104531 (JP 2009-104531 A) discloses a technology in which frequency distribution statistics of road attribute information that affects road travel on a hazard occurrence location are specified for every hazard type and representative characteristics of a road environment are specified for each hazard type on the basis of the frequency distribution statistics to extract a potential hazardous location that matches the representative characteristics.

SUMMARY

In the technology according to the related art, guidance on a guide event may not be provided at a potential hazardous location etc. even if the guide event which may be the cause of the potential hazardous location etc. may occur. That is, when a guide event for a potential hazardous location etc. is specified on the basis of a travel history, a driver can be alarmed to prevent the recurrence of the cause of the guide event by providing guidance to the driver. Thus, in the case where guidance on a guide event is provided, it is expected that the guide event will not recur. In the technology according to the related art, however, a travel history is acquired without considering whether or not guidance is provided for a vehicle. Therefore, distinction cannot be made between a travel history in which a guide event did not recur because guidance on the guide event had been provided and a travel history in which a guide event did not recur because the cause of the guide event had been resolved. Therefore, a situation may arise in which it is considered that the cause of a guide event has been resolved because of an increase of travel histories in which the guide event was not detected. In such a situation, guidance on a guide event may not be provided even if the cause of the guide event has not been resolved.

Exemplary embodiments of the broad inventive principles described herein provide a technology for reducing the possibility of occurrence of a situation in which guidance on a guide event is not provided when the cause of the guide event has not been resolved.

In order to achieve the foregoing object, a drive assist system includes: guide location acquisition means for referencing a storage medium to acquire a guide location at which guidance associated with a guide event as a guide target is to be provided; event information acquisition means for acquiring event information indicating whether or not the guide event was detected from a vehicle for which setting can be selectively made so as to or so as not to provide guidance associated with the guide event and for which the setting has been made so as not to provide guidance, and which performed detection processing for the guide event at the guide location; stored information management means for determining whether or not to stop provision of guidance associated with the guide event at the guide location on the basis of the event information, and correcting information stored in the storage medium so as to stop provision of guidance associated with the guide event at the guide location for which it is determined to stop provision of guidance associated with the guide event; and guide information transmission means for acquiring information indicating the guide location for which provision of guidance associated with the guide event has not been stopped and the guide event from the storage medium, and transmitting the acquired information to the vehicle.

In order to achieve the foregoing object, in addition, a drive assist method includes: a guide location acquisition step of referencing a storage medium to acquire a guide location at which guidance associated with a guide event as a guide target is to be provided; an event information acquisition step of acquiring event information indicating whether or not the guide event was detected from a vehicle for which setting can be selectively made so as to or so as not to provide guidance associated with the guide event and for which the setting has been made so as not to provide guidance, and which performed detection processing for the guide event at the guide location; a stored information management step of determining whether or not to stop provision of guidance associated with the guide event at the guide location on the basis of the event information, and correcting information stored in the storage medium so as to stop provision of guidance associated with the guide event at the guide location for which it is determined to stop provision of guidance associated with the guide event; and a guide information transmission step of acquiring information indicating the guide location for which provision of guidance associated with the guide event has not been stopped and the guide event from the storage medium, and transmitting the acquired information to the vehicle.

In order to achieve the foregoing object, further, a drive assist program causes a computer to implement: a guide location acquisition function of referencing a storage medium to acquire a guide location at which guidance associated with a guide event as a guide target is to be provided; an event information acquisition function of acquiring event information indicating whether or not the guide event was detected from a vehicle for which setting can be selectively made so as to or so as not to provide guidance associated with the guide event and for which the setting has been made so as not to provide guidance, and which performed detection processing for the guide event at the guide location; a stored information management function of determining whether or not to stop provision of guidance associated with the guide event at the guide location on the basis of the event information, and correcting information stored in the storage medium so as to stop provision of guidance associated with the guide event at the guide location for which it is determined to stop provision of guidance associated with the guide event; and a guide information transmission function of acquiring information indicating the guide location for which provision of guidance associated with the guide event has not been stopped and the guide event from the storage medium, and transmitting the acquired information to the vehicle.

With the drive assist system, method, and program, as described above, event information indicating whether or not the guide event was detected is acquired from a vehicle for which the setting has been made so as not to provide guidance associated with the guide event, and it is determined on the basis of the event information whether or not to stop provision of guidance associated with the guide event at the guide location. That is, the event information, on the basis of which it is determined whether or not to stop provision of guidance associated with the guide event, is acquired from a vehicle for which the setting has been made so as not to provide guidance associated with the guide event. Thus, in the case where the guide event was not detected, it is highly likely that the guide event was not detected because the guide event had been resolved, rather than because the driver of the vehicle paid attention in response to guidance associated with the guide event. Therefore, by determining whether or not to stop provision of guidance associated with the guide event at the guide location on the basis of the event information, acquiring information indicating the guide location for which provision of guidance associated with the guide event has not been stopped and the guide event, and transmitting the acquired information to the vehicle, it is possible to reduce the possibility of occurrence of a situation in which guidance on the guide event is not provided for the vehicle when the cause of the guide event has not been resolved.

DETAILED DESCRIPTION OF EXEMPLARY EMBODIMENTS

Figure 1:
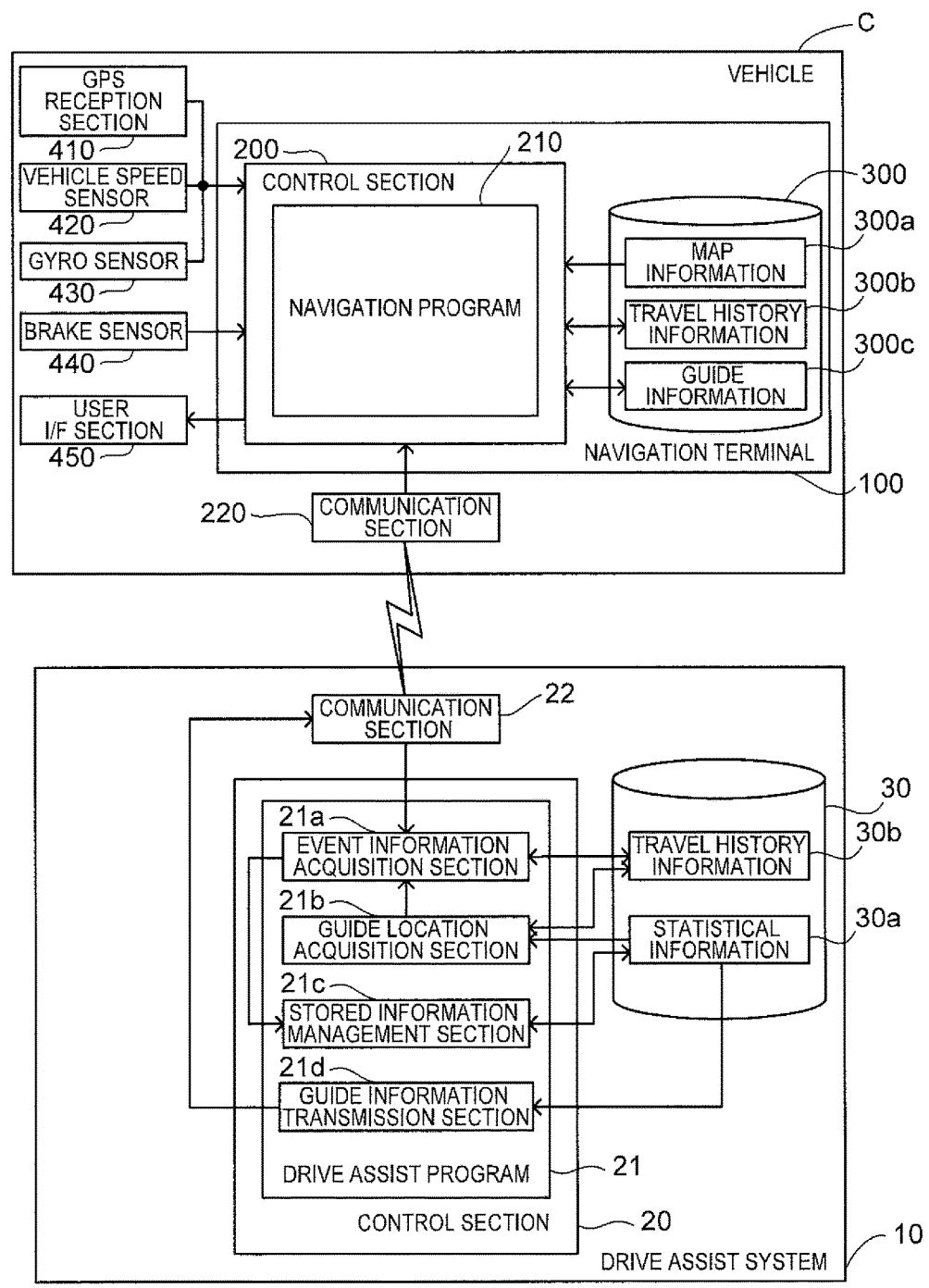
FIG. 1 is a block diagram of a drive assist system.

Hereinafter, embodiments will be described in the following order:
(1) Configuration of Drive Assist System
(1-1) Configuration of Navigation Terminal
(1-2) Configuration of Drive Assist System
(2) State of Statistical Information
(3) Drive Assist Processing
(3-1) Statistical Processing
(3-2) Acquisition Condition Transmission Processing
(3-3) Guide Information Transmission Processing
(4) Guide Processing
(5) Other Embodiments
(1) Configuration of Drive Assist System FIG. 1 is a block diagram illustrating the configuration of a drive assist system according to an embodiment. A drive assist system 10 according to the embodiment cooperates with a navigation terminal 100 provided to a vehicle C.
(1-1) Configuration of Navigation Terminal The navigation terminal 100 is mounted on a plurality of vehicles C that travel on roads. The navigation terminal 100 includes a control section 200 that includes a CPU, a RAM, a ROM, and so forth and a storage medium 300. (As used herein, the term "storage medium" is not intended to encompass transitory signals.) The control section 200 can execute programs stored in the storage medium 300 and the ROM. In the embodiment, the control section 200 can execute a navigation program 210 as one of the programs.

Further, the vehicle C includes a communication section 220, a GPS reception section 410, a vehicle speed sensor 420, a gyro sensor 430, a brake sensor 440, and a user I/F section 450. The communication section 220 is constituted of a circuit for wireless communication. The control section 200 can control the communication section 220 to communicate with the drive assist system 10. The GPS reception section 410 receives radio waves from GPS satellites to output a signal for calculating the current location of the vehicle C via an interface (not illustrated). The control section 200 acquires the signal to acquire the current location of the vehicle C. The vehicle speed sensor 420 outputs a signal corresponding to the rotational speed of wheels of the vehicle C. The control section 200 acquires the signal via an interface (not illustrated) to acquire the vehicle speed. The gyro sensor 430 detects the angular acceleration of gyration of the vehicle C in a horizontal plane to output a signal corresponding to the orientation of the vehicle C. The control section 200 acquires the signal to acquire the direction of travel of the vehicle C. The vehicle speed sensor 420, the gyro sensor 430, and so forth are utilized to specify a travel track of the vehicle C. In the embodiment, the current location is specified on the basis of the departure location and the travel track of the vehicle C, and the current location of the vehicle C specified on the basis of the departure location and the travel track is corrected on the basis of the output signal from the GPS reception section 410.

The storage medium 300 stores map information 300a. The map information 300a includes node data indicating the position etc. of nodes set on roads on which the vehicle C travels, shape interpolation data indicating the position etc. of shape interpolation points for specifying the shape of the roads between the nodes, link data indicating coupling between the nodes, facility data indicating facilities that may be a destination location of an expected travel route, and so forth. In the embodiment, the link data are correlated with information indicating the direction of travel of the vehicle C in road sections corresponding to the links. The control section 200 can specify a road section corresponding to a link on the basis of the node data and the link data indicated by the map information 300a to specify the current location of the vehicle C in each road section. In addition, the control section 200 can specify the direction of travel on a road on the basis of the link data indicated by the map information 300a.

The brake sensor 440 is a sensor that detects the amount of operation of a brake pedal of the vehicle C. The control section 200 can determine whether or not a brake operation corresponds to abrupt braking by acquiring information indicating the detected amount and specifying the amount of operation of the brake pedal per unit time.

The user I/F section 450 is an interface section that receives input of a command from a driver and that provides various kinds of information to the driver, and includes a display section that also serves as an input section constituted of a touch panel display (not illustrated), and an output section for output sound such as a speaker. Through the function of the navigation program 210, the control section 200 can cause the user I/F section 450 to display the current location of the vehicle C and a map of an area around the current location. That is, the control section 200 acquires the current location of the vehicle C, and generates an image indicating a map of an area around the current location on the basis of the map information 300a to output the image to the user I/F section 450. As a result, a display section of the user VP section 450 displays a map including the current location.

Furthermore, the navigation program 210 according to the embodiment can cause the control section 200 to implement a function of acquiring a travel history of the vehicle C in the course of travel of the vehicle C and a function of providing guidance on a guide event specified on the basis of the travel history at a guide location. That is, through processing performed by the navigation program 210, the control section 200 can detect that a guide event decided in advance occurred and that a guide event did not occur on the basis of an operation performed in the vehicle C in the course of travel, variations in current location, etc., and store a travel history indicating the detection results as travel history information 300b in the storage medium 300.

The guide event is an object about which the driver of the vehicle C is alarmed so that the guide event will not recur during travel of the vehicle C. Herein, examples of the guide event decided in advance include abrupt braking and reverse travel on a road. That is, the control section 200 can specify occurrence of abrupt braking on the basis of the amount of operation of the brake pedal detected by the brake sensor 440 in the course of travel of the vehicle C, and in the case where abrupt braking has occurred, specify the location of occurrence of the abrupt braking from the current location of the vehicle C. The control section 200 stores, in the storage medium 300, detection information indicating the situation of occurrence of abrupt braking along with the location of occurrence as included in the travel history information 300b. In addition, after a guide location with abrupt braking determined as a guide event, a candidate for the guide location (hereinafter referred to as a "guide location candidate"), and a candidate for a location at which provision of guidance on the guide event is to be stopped (hereinafter referred to as a "stop candidate") are specified (after guide information is transmitted to the vehicle C), the control section 200 can specify that abrupt braking did not occur at the guide location, the guide location candidate, or the stop candidate. In the case where abrupt braking did not occur, the control section 200 stores, in the storage medium 300, non-detection information indicating that abrupt braking did not occur at the guide location, the guide location candidate, or the stop candidate as included in the travel history information 300b. The detection information and the non-detection information in the embodiment correspond to event information indicating whether or not a guide event was detected.

Furthermore, the control section 200 can detect whether or not the vehicle C made reverse travel in a road section from the direction of travel on the road section indicated by the map information 300a and the transition of the current location of the vehicle C. In the case where reverse travel occurred, the control section 200 stores, in the storage medium 300, detection information indicating that reverse travel occurred and the location of occurrence of the reverse travel as included in the travel history information 300b. In addition, after a guide location with reverse travel determined as a guide event, a guide location candidate, and a stop candidate are specified, the control section 200 can specify that reverse travel did not occur at the guide location, the guide location candidate, or the stop candidate. In the case where reverse travel did not occur, the control section 200 stores, in the storage medium 300, non-detection information indicating that reverse travel did not occur at the guide location, the guide location candidate, or the stop candidate as included in the travel history information 300b.

In the embodiment, the control section 200 can transmit the travel history information 300b to the drive assist system 10 via the communication section 220. It should be noted, however, that in the embodiment, the travel history information 300b to be transmitted is selected in accordance with setting as to whether or not to provide guidance on a guide event. That is, in the case where setting has been made so as not to provide guidance on a guide event for the vehicle C, the control section 200 transmits the travel history information 300b including the detection information or the non-detection information. In the case where setting has been made so as to provide guidance on a guide event for the vehicle C, the control section 200 does not transmit the travel history information 300b including the detection information or the non-detection information. With the configuration, a resource (a communication band for communication with the vehicle C and a control section for performing detection processing in the vehicle C) for transmitting the event information to the drive assist system 10 can be simplified. In the drive assist system 10, a guide event and a guide location are specified on the basis of the travel history information 300b transmitted from the plurality of vehicles C, and information indicating the guide event and the guide location is transmitted to the vehicle C. The control section 200 acquires the information indicating the guide event and the guide location to store the information as guide information 300c in the storage medium 300.

Through processing performed by the navigation program 210, the control section 200 provides guidance on the guide event at the guide location on the basis of the guide information 300c. In the embodiment, a selection can be made between setting made so as to provide guidance on the guide event and setting made so as not to provide guidance on the guide event. That is, the user operates an input section of the user I/F section 450 in advance to select one of setting made so as to provide guidance on the guide event and setting made so as not to provide guidance on the guide event. When setting is made, the control section 200 stores the content of the setting in the storage medium 300. In the case where setting has been made so as to provide guidance on the guide event, through processing performed by the navigation program 210, the control section 200 determines whether or not the vehicle C has approached the guide location indicated by the guide information 300c. In the case where the vehicle C has approached the guide location, the control section 200 outputs, to the user I/F section 450, a control signal for indicating the guide event through an image and a sound. As a result, guidance on the guide event is provided from the user I/F section 450. In the case where setting has been made so as not to provide guidance on the guide event, the control section 200 does not provide guidance on the guide event. The setting may be made for each guide location, or may be made for all the guide locations.

(1-2) Configuration of Drive Assist System

The drive assist system 10 includes the control section 20 which includes a CPU, a RAM, a ROM, and so forth and a storage medium 30. The control section 20 can execute programs stored in the storage medium 30 and the ROM. The drive assist system 10 further includes the communication section 22. The communication section 22 is constituted of a circuit for wireless communication. The control section 20 can control the communication section 22 to communicate with the vehicle C.

In the embodiment, the control section 20 can execute a drive assist program 21 stored in the storage medium 30. Through processing performed by the drive assist program 21, the control section 20 specifies a guide event and a guide location on the basis of travel history information, and transmits guide information indicating the guide event and the guide location to the vehicle C. To this end, the drive assist program 21 includes an event information acquisition section 21a, a guide location acquisition section 21b, a stored information management section 21c, and a guide information transmission section 21d.

The event information acquisition section 21*a* is a program module that causes the control section 20 to implement a function of acquiring the travel history information 300*b* from the vehicle C and storing the travel history information 300*b* in the storage medium 30 as travel history information 30*b*. That is, the control section 20 acquires the travel history information 300*b* from the vehicle C to acquire detection information or non-detection information from the vehicle C which performed detection processing for a guide event at a guide location. The travel history information 300*b* is not transmitted from the vehicle C for which setting has been made so as to provide guidance on a guide event. The travel history information 300*b* is transmitted from the vehicle C for which setting has been made so as not to provide guidance on a guide event. Thus, the control section 20 is configured to acquire detection information or non-detection information, which corresponds to event information, from the vehicle C which performed detection processing for a guide event at a guide location and for which setting has been made so as not to provide guidance, and not to acquire detection information or non-detection information, which corresponds to event information, from the vehicle C which performed detection processing for a guide event at a guide location and for which setting has been made so as to provide guidance. In the embodiment, the control section 20 prescribes an acquisition condition for information included in the travel history transmitted from the vehicle C in accordance with the state of statistical information to be discussed later, which will be discussed in detail later.

The guide location acquisition section 21*b* is a program module that causes the control section 20 to implement a function of referencing the storage medium 30 to acquire a guide location at which guidance on a guide event as a guide target is to be provided. That is, through processing performed by the stored information management section 21*c* to be discussed later, the control section 20 generates statistical information 30*a* on the basis of the detection information or the non-detection information included in the travel history information 30*b*, and can specify a guide location and a guide event on the basis of the statistical information 30*a* in the case where the guide location is specified. Through processing performed by the guide location acquisition section 21*b*, the control section 20 references the statistical information 30*a* to acquire the guide location.

The stored information management section 21*c* is a program module that causes the control section 20 to implement a function of specifying a guide location candidate, a function of specifying a guide location, and a function of stopping provision of guidance on a guide event at a guide location. The function of specifying a guide location candidate and the function of specifying a guide location will be discussed in detail using a flowchart to be discussed later.

The function of stopping provision of guidance on a guide event at a guide location is implemented by a determination made on the basis of the event information. That is, through processing performed by the stored information management section 21*c*, the control section 20 determines whether or not to stop provision of guidance on a guide event at a guide location on the basis of the detection information and the non-detection information acquired as the travel history information 30*b*. Specifically, in the embodiment, the control section 20 determines whether or not the acquisition rate of the non-detection information, that is, the number of acquired pieces of non-detection information/(the number of acquired pieces of non-detection information+the number of acquired pieces of detection information), is equal to or more than a stop ratio decided in advance, and determines to stop provision of guidance on a guide event in the case where the acquisition rate of the non-detection information is equal to or more than the stop ratio.

The control section 20 then deletes a guide location for which it is determined to stop provision of guidance on a guide event from the statistical information 30*a* so that the deleted location will not be transmitted to the vehicle C as a guide location. That is, the control section 20 corrects information stored in the storage medium 30 so as to stop provision of guidance on a guide event at a guide location.

The guide information transmission section 21*d* is a program module that causes the control section 20 to implement a function of acquiring information indicating a guide location for which provision of guidance on a guide event is not stopped and the guide event from the storage medium 30 to transmit the acquired information to the vehicle C. That is, the control section 20 acquires guide information indicating a guide location and a guide event to transmit the acquired information to the vehicle C via the communication section 22 so that guidance on the guide event will be provided at the guide location when the vehicle C travels through the guide location. In the embodiment, a guide location for which provision of guidance on a guide event is stopped is deleted from the statistical information 30*a*, and therefore the control section 20 acquires information indicating a guide location for which provision of guidance on a guide event is not stopped and the guide event to transmit the acquired information to the vehicle C.

As described above, the control section 20 acquires detection information or non-detection information from the vehicle C for which setting has been made so as not to provide guidance on a guide event, and determines whether or not to stop provision of guidance on a guide event at a guide location on the basis of such information. That is, the detection information or the non-detection information, on the basis of which it is determined whether or not to stop provision of a guide event, is acquired from the vehicle C for which setting has been made so as not to provide guidance on a guide event. Thus, in the case where a guide event was not detected (in the case where non-detection information was not acquired), it is highly likely that a guide event was not detected because the guide event had not been resolved, rather than because the driver of the vehicle C paid attention in response to guidance on the guide event. Therefore, by determining whether or not to stop provision of guidance on a guide event at a guide location on the basis of information acquired from the vehicle C for which setting has been made so as not to provide guidance on a guide event, and acquiring information indicating a guide location for which provision of guidance on a guide event has not been stopped and the guide event to transmit the acquired information to the vehicle C, it is possible to reduce the possibility of occurrence of a situation in which guidance on a guide event is not provided for the vehicle C when the cause of the guide event has not been resolved.

(2) State of Statistical Information

Next, the state of the statistical information 30*a* will be described in detail with reference to FIGS. 2A to 2D. In the embodiment, the statistical information 30*a* is a database that stores the detection information and the non-detection information, and defines four states (first to fourth states) for each of combinations of a location and a guide event. At least one of the detection information and the non-detection information is stored for each of the states. For example, in the case where a certain guide event E is detected at a certain location P, information may be stored in the first state, the second state, the third state, and the fourth state for the combination of the location P and the guide event E. In the case where non-detection information is acquired in the first state, the non-detection information is correlated with the first state to be stored in the storage medium as the statistical information 30a. The location is defined as one of a guide location, a guide location candidate, and a stop candidate. The statistical information 30a is correlated with information indicating which of a guide location, a guide location candidate, and a stop candidate the location is. For example, in the case where a certain location is specified as a guide location, the statistical information 30a is correlated with information indicating that the location is a guide location.

Figure 2A:
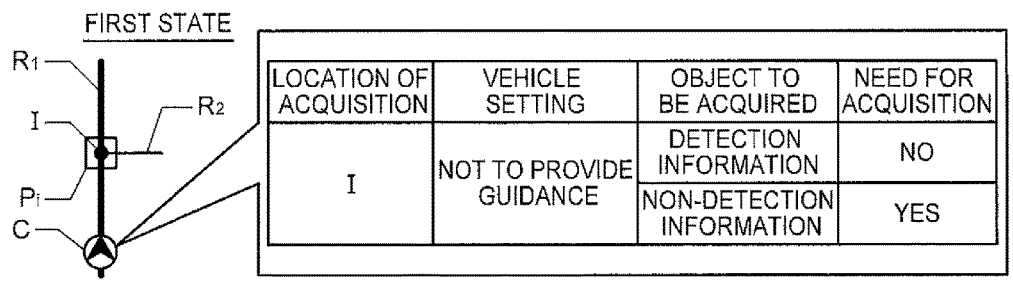
FIGS. 2A to 2D each illustrate a state of statistical information.
Figure 2B:
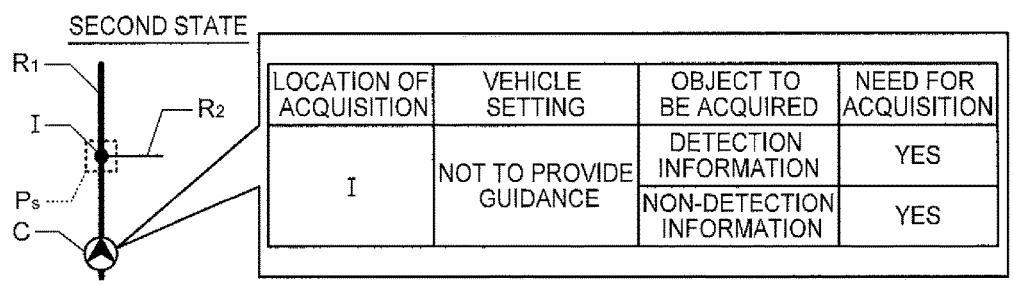
Figure 2C:
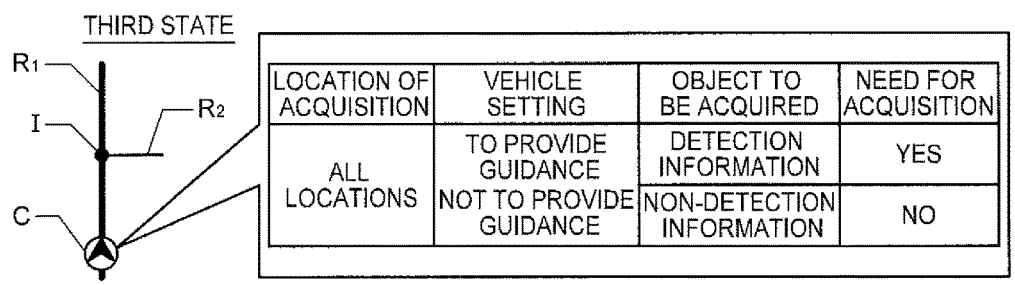
Figure 2D:
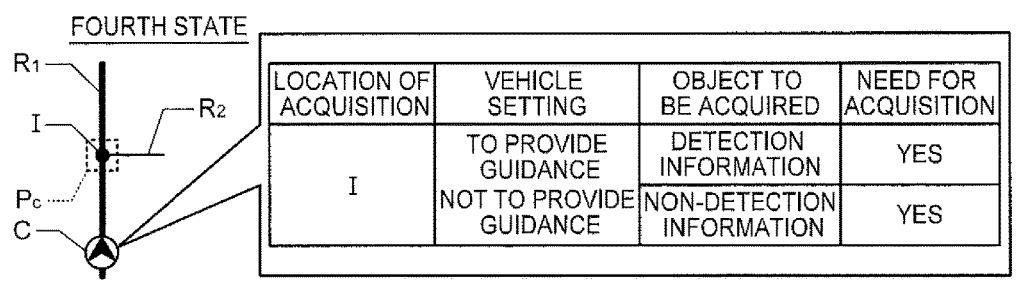

Which of the first to fourth states the current state corresponds to is decided in accordance with whether or not a guide location, a guide location candidate, or a stop candidate has been specified, and it is decided whether or not to acquire the non-detection information and the detection information in accordance with the setting made so as to whether or not to provide guidance on a guide event for the vehicle C in each state. FIGS. 2A to 2D illustrate whether or not the detection information and the non-detection information are acquired as a travel history in order that the statistical information 30a is generated which is about an intersection I at which a wide road $R_1$ and a narrow road $R_2$ intersect each other. FIG. 2A illustrates the first state. FIG. 2B illustrates the second state. FIG. 2C illustrates the third state. FIG. 2D illustrates the fourth state. In the embodiment, as discussed later, an acquisition proportion may be adjusted in accordance with the state of the statistical information 30a and the guide event. Here, for simplicity, the acquisition proportion will not be taken into consideration.

In the first state illustrated in FIG. 2A, the intersection I has been specified as a guide location, and it is indicated in FIG. 2A that the intersection I is a guide location Pi. In the first state, the intersection I has been specified as a guide location. In this state, the guide location has been specified because occurrence of a guide event due to some cause is statistically specified. If the cause is resolved in this state, the guide event will not occur. In the state in which the guide event will not occur, provision of guidance on the guide event at the guide location should be stopped. Thus, in the first state, in order to determine whether or not the guide location is a stop candidate for which provision of guidance on a guide event is stopped, non-detection information is acquired from the vehicle C for which setting has been made so as not to provide guidance on a guide event, and the guide location is set to a stop candidate for which provision of guidance on a guide event is stopped in the case where the number of acquired pieces of non-detection information is equal to or more than a predetermined stop threshold.

In the first state, it is determined whether or not the guide location is a stop candidate for which provision of guidance on a guide event is stopped on the basis of the number of acquired pieces of non-detection information, and therefore it is not necessary to reference detection information for the determination. Thus, in the first state, detection information is not acquired from the vehicle C for the determination. In FIG. 2A, it is indicated in the table that the vehicle C is set so as "not to provide guidance" on a guide event, and that information to be acquired includes non-detection information.

In the second state illustrated in FIG. 2B, the intersection I has been specified as a stop candidate for which provision of guidance on a guide event is stopped, and it is indicated in FIG. 2B by use of a symbol Ps that the intersection I is a stop candidate. In the second state, in order to determine whether or not to stop provision of guidance on a guide event at the stop candidate, non-detection information and detection information are acquired from the vehicle C for which setting has been made so as not to provide guidance on a guide event, and the guide location as the stop candidate is deleted in the case where the acquisition rate of the non-detection information is equal to or more than a predetermined stop ratio. In FIG. 2B, it is indicated in the table that the vehicle C is set so as "not to provide guidance" on a guide event, and that information to be acquired includes non-detection information and detection information.

In the third state illustrated in FIG. 2C, a candidate for a guide location has not been specified. In the third state, in order to specify a candidate for a guide location, detection information is acquired from the vehicle C for which setting has been made so as not to provide guidance on a guide event and the vehicle C for which setting has been made so as to provide guidance on a guide event. Next, a location for which the number of acquired pieces of detection information is equal to or more than a predetermined registration threshold is specified as a candidate for a guide location. In FIG. 2C, thus, it is indicated in the table that the vehicle C is set so as "to provide guidance" and "not to provide guidance" on a guide event, and that information to be acquired includes detection information.

In the fourth state illustrated in FIG. 2D, a candidate for a guide location has been specified, and it is indicated in FIG. 2D by use of a symbol Pc that the intersection I is a candidate for a guide location. In the fourth state, in order to specify whether or not the candidate for a guide location is a guide location, detection information and non-detection information are acquired from the vehicle C for which setting has been made so as not to provide guidance on a guide event and the vehicle C for which setting has been made so as to provide guidance on a guide event. Next, a location for which the acquisition rate of the detection information is equal to or more than a predetermined registration ratio is specified as a guide location. In FIG. 2D, thus, it is indicated in the table that the vehicle C is set so as "to provide guidance" and "not to provide guidance" on a guide event, and that information to be acquired includes detection information and non-detection information.

The guide location, the stop candidate, and the guide location candidate are each a specific location. Therefore, an acquisition condition for acquiring detection information and non-detection information for a specific location is prescribed in the first state, the second state, and the fourth state. In the third state in which a location has not been specified, on the other hand, an acquisition condition for acquiring detection information is prescribed without specifying a location (detection information is acquired for any location). In FIGS. 2A, 2B, and 2D, the fact that detection information and non-detection information are acquired in dependence on the location is indicated by the location of acquisition being the intersection I. In FIG. 2C, the fact that detection information is acquired without dependence on the location is indicated by the location of acquisition being all locations.

(3) Drive Assist Processing

Figure 3:
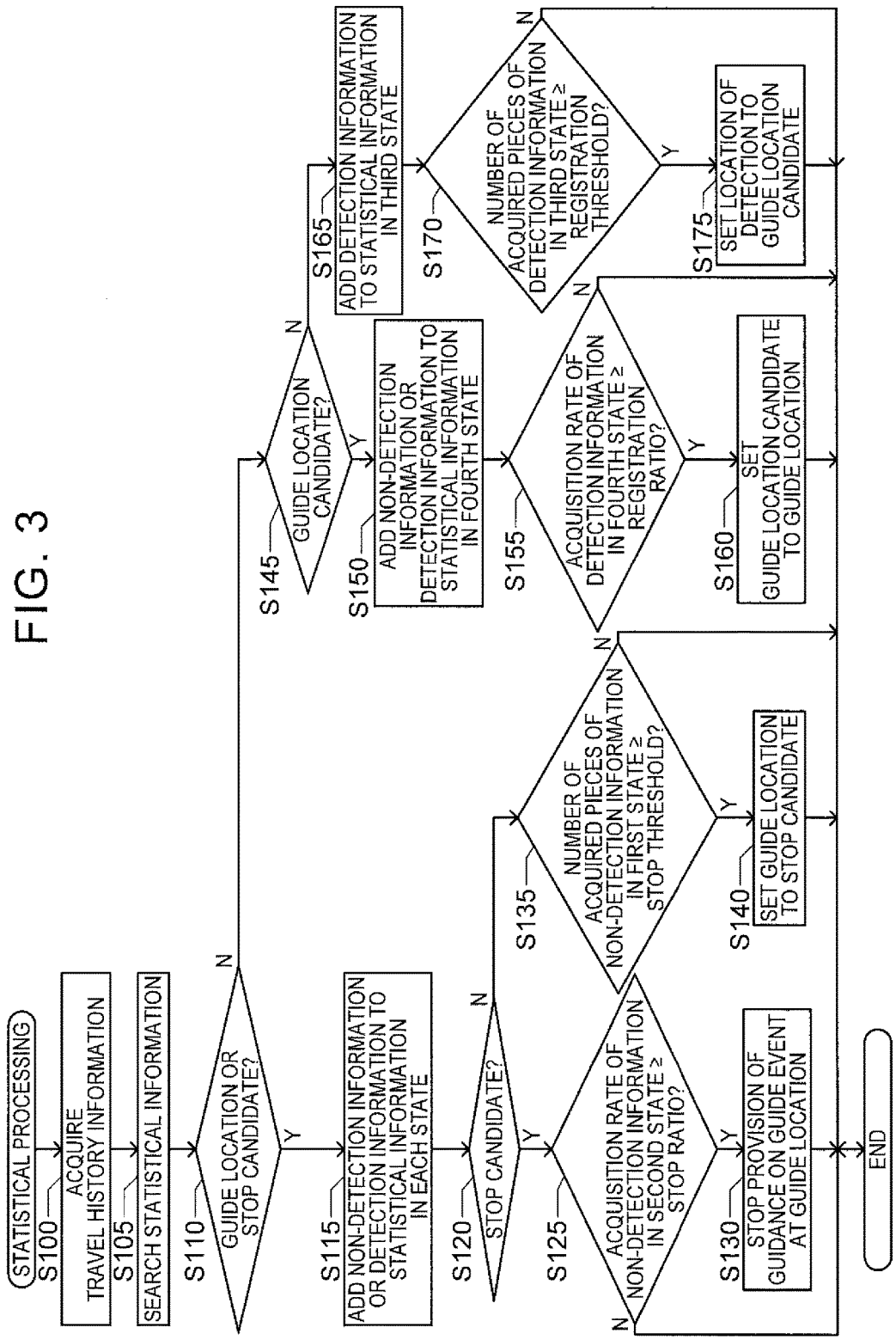
FIG. 3 is a flowchart of statistical processing.
Figure 4:
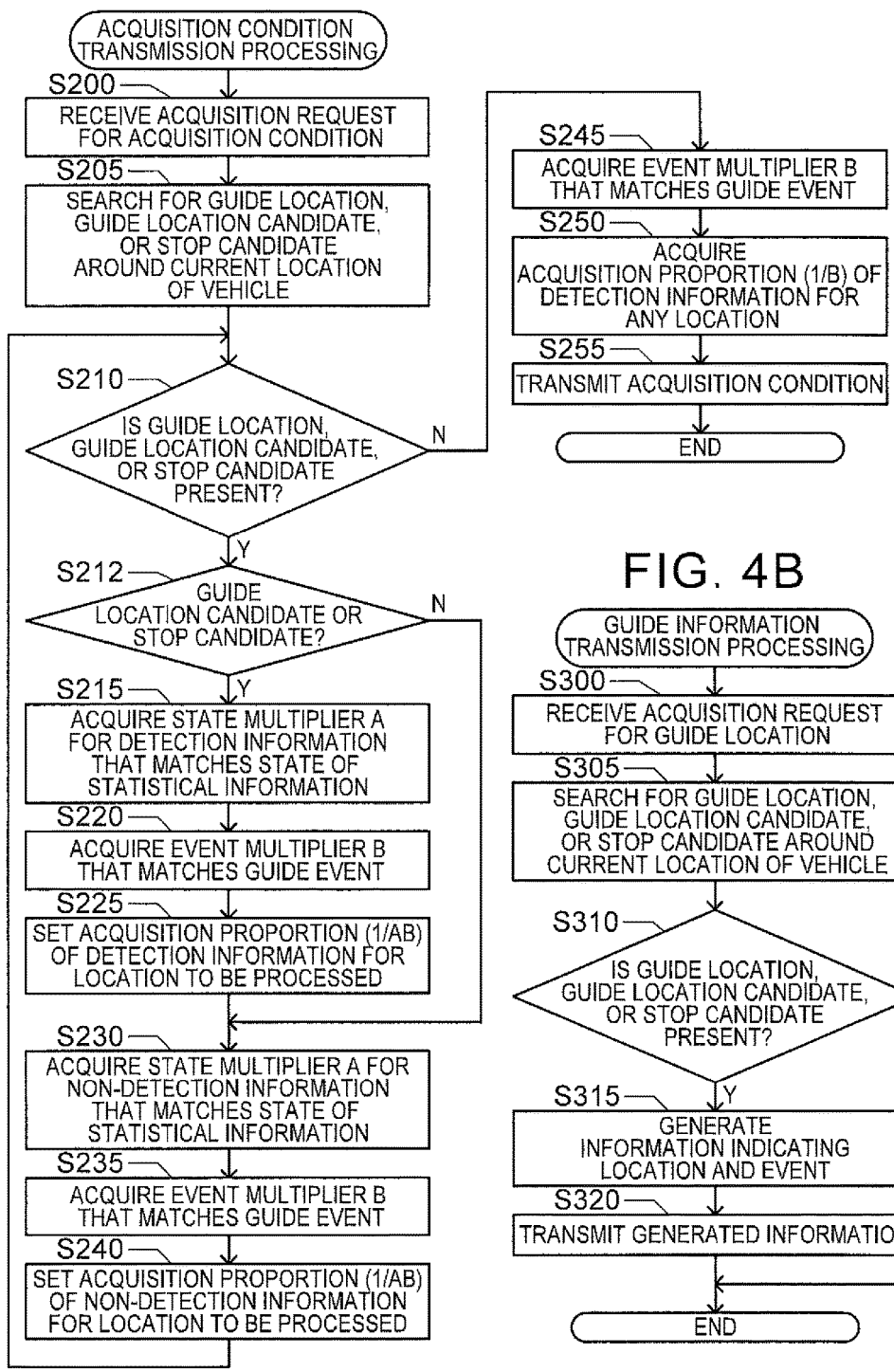
FIG. 4A is a flowchart of acquisition condition transmission processing.
FIG. 4B is a flowchart of guide information transmission processing.

Next, drive assist processing executed by the drive assist program 21 will be described in detail. FIG. 3 illustrates statistical processing for specifying a guide location to be transmitted to the vehicle C. FIG. 4A illustrates acquisition condition transmission processing for transmitting an acquisition condition for a travel history to the vehicle C. FIG. 4B illustrates guide information transmission processing for transmitting the specified guide location to the vehicle C.

Such processing constitutes the drive assist processing executed by the control section 20 in accordance with the drive assist program 21.

(3-1) Statistical Processing

The statistical processing illustrated in FIG. 3 is executed in the case where travel history information is transmitted from the vehicle C. In the statistical processing, through processing performed by the event information acquisition section 21a, the control section 20 acquires travel history information (step S100), and stores the travel history information in the storage medium 30 as the travel history information 30b. In addition, through processing performed by the guide location acquisition section 21b, the control section 20 searches for statistical information (step S105). Next, through processing performed by the guide location acquisition section 21b, the control section 20 determines whether or not a location included in the travel history information 30b acquired in step S100 coincides with the existing guide location or stop candidate (step S110).

That is, the travel history information 30b includes detection information or non-detection information, and the detection information and the non-detection information are correlated with a location at which a guide event was detected and a location at which a guide event was not detected, respectively (as discussed in detail later). In addition, the statistical information 30a is defined for each combination of a location (a guide location, a guide location candidate, or a stop candidate) and a guide event. Thus, the control section 20 determines whether or not the location included in the travel history information 30b coincides with the guide location or the stop candidate included in the statistical information 30a.

In the case where it is determined in step S110 that the location included in the travel history information 30b coincides with the guide location or the stop candidate included in the statistical information 30a, through processing performed by the stored information management section 21e, the control section 20 adds the non-detection information or the detection information to the statistical information in each of the states (step S115). That is, in the case where it is determined in step S110 that the location included in the travel history information 30b coincides with the guide location included in the statistical information 30a, the state of the statistical information 30a is the first state illustrated in FIG. 2A. Thus, the travel history information 30b includes non-detection information acquired by the vehicle C for which setting has been made so as not to provide guidance on a guide event. Thus, the control section 20 adds the non-detection information included in the travel history information 30b to the statistical information 30a with the guide location which is determined to coincide with the location indicated by the travel history information 30b.

In the case where it is determined in step S110 that the location included in the travel history information 30b coincides with the stop candidate included in the statistical information 30a, on the other hand, the state of the statistical information 30a is the second state illustrated in FIG. 2B. Thus, the travel history information 30b includes non-detection information or detection information acquired by the vehicle C for which setting has been made so as not to provide guidance on a guide event. Thus, the control section 20 adds the non-detection information or the detection information included in the travel history information 30b to the statistical information 30a with the stop candidate which is determined to coincide with the location indicated by the travel history information 30b.

Next, through processing performed by the stored information management section 21c, the control section 20 determines whether or not the location included in the travel history information 30b is a stop candidate (step S120). In the case where it is determined in step S120 that the location included in the travel history information 30b is a stop candidate, through processing performed by the stored information management section 21c, the control section 20 determines whether or not the acquisition rate of the non-detection information in the second state is equal to or more than the stop ratio (step S125). That is, the control section 20 references the statistical information 30a on the stop candidate in the second state, acquires the acquisition rate of the non-detection information from (the number of acquired pieces of non-detection information/(the number of acquired pieces of non-detection information+the number of acquired pieces of detection information), and compares the acquired acquisition rate with the stop ratio.

Subsequently, in the case where it is determined in step S125 that the acquisition rate of the non-detection information in the second state is equal to or more than the stop ratio, through processing performed by the stored information management section 21c, the control section 20 stops provision of guidance on a guide event at a guide location (step S130). In the case where it is not determined in step S125 that the acquisition rate of the non-detection information in the second state is equal to or more than the stop ratio, through processing performed by the stored information management section 21c, the control section 20 skips step S130. That is, in the embodiment, a condition under which provision of guidance on a guide event should be stopped is prescribed using the acquisition rate of the non-detection information in the second state. The stop ratio may be decided in advance as an acquisition rate at which provision of guidance on a guide event should be stopped. The stop ratio is prescribed in advance such that the cause of guidance on a guide event can be considered to be resolved in the case where the acquisition rate is equal to or more than the stop ratio.

In the case where it is not determined in step S120 that the location included in the travel history information 30b is a stop candidate, on the other hand, through processing performed by the stored information management section 21c, the control section 20 determines whether or not the number of acquired pieces of non-detection information in the first state is equal to or more than the stop threshold (step S135). That is, in the case where it is not determined that the location included in the travel history information 30b is a stop candidate, the location included in the travel history information 30b acquired in step S100 is a guide location, and the current state of the statistical information 30a is the first state. Thus, the control section 20 references the statistical information 30a on the guide location in the first state, specifies the number of acquired pieces of non-detection information, and compares the specified number with the stop threshold.

Next, in the case where it is determined in step S135 that the number of acquired pieces of non-detection information in the first state is equal to or more than the stop threshold, through processing performed by the stored information management section 21c, the control section 20 sets the guide location to a stop candidate (step S140). That is, the control section 20 correlates the statistical information 30a on the guide location with information indicating that the location is a stop candidate. In the case where it is not determined in step S135 that the number of acquired pieces of non-detection information in the first state is equal to or more than the stop threshold, through processing performed by the stored information management section 21c, the control section 20 skips step S140. That is, in the embodiment, a condition under which the guide location should be set to a stop candidate is prescribed using the number of acquired pieces of non-detection information in the first state. The stop threshold may be decided in advance as the number of acquired pieces with which the guide location should be set to a stop candidate. The stop threshold is prescribed in advance such that it is estimated with a predetermined accuracy that the cause of guidance on a guide event is resolved in the case where the number of acquired pieces is equal to or more than the stop threshold. In the embodiment, detection information is not acquired in the first state. Therefore, it is determined whether or not the guide location should be set to a stop candidate in accordance with the number of acquired pieces rather than the acquisition rate.

In the case where it is not determined in step S110 that the location included in the travel history information 30b coincides with the guide location or the stop candidate included in the statistical information 30a, through processing performed by the stored information management section 21c, the control section 20 determines whether or not the location included in the travel history information 30b coincides with the guide location candidate included in the statistical information 30a (step S145).

In the case where it is determined in step S145 that the location included in the travel history information 30b coincides with the guide location candidate included in the statistical information 30a, through processing performed by the stored information management section 21c, the control section 20 adds the non-detection information or the detection information to the statistical information in the fourth state (step S150). That is, in the case where it is determined in step S145 that the location included in the travel history information 30b coincides with the guide location candidate included in the statistical information 30a, the state of the statistical information 30a is the fourth state illustrated in FIG. 2D. Thus, the travel history information 30b includes non-detection information or detection information acquired by the vehicle C for which setting has been made so as not to provide guidance on a guide event or the vehicle C for which setting has been made so as to provide guidance on a guide event. Thus, the control section 20 adds the non-detection information or the detection information included in the travel history information 30b to the statistical information 30a with the guide location candidate which is determined to coincide with the location indicated by the travel history information 30h.

Next, through processing performed by the stored information management section 21c, the control section 20 determines whether or not the acquisition rate of the detection information in the fourth state is equal to or more than the registration ratio (step S155). That is, the control section 20 references the statistical information 30a on the guide location candidate in the fourth state, acquires the acquisition rate of the detection information from (the number of acquired pieces of detection information/(the number of acquired pieces of non-detection information+the number of acquired pieces of detection information), and compares the acquired acquisition rate with the registration ratio.

Next, in the case where it is determined in step S155 that the acquisition rate of the detection information in the fourth state is equal to or more than the registration ratio, through processing performed by the stored information management section 21c, the control section 20 sets the guide location candidate to a guide location (step S160). That is, the control section 20 correlates the statistical information 30a, which has been correlated with information indicating that the location is a guide location candidate, with information indicating that the location is a guide location. In the case where it is not determined in step S155 that the acquisition rate of the detection information in the fourth state is equal to or more than the registration ratio, through processing performed by the stored information management section 21c, the control section 20 skips step S160. That is, in the embodiment, a condition under which the guide location candidate should be set to a guide location is prescribed using the acquisition rate of the detection information in the fourth state. The registration ratio may be decided in advance as the acquisition rate at which the guide location candidate should be set to a guide location. The registration ratio is prescribed in advance such that the cause of guidance on a guide event can be considered to occur in the case where the acquisition rate is equal to or more than the registration ratio.

In the case where it is not determined in step S145 that the location included in the travel history information 30b coincides with the guide location candidate included in the statistical information 30a, that is, in the case where the location included in the travel history information 30b is not any of a guide location, a stop candidate, and a guide location candidate, through processing performed by the stored information management section 21e, the control section 20 adds the detection information to the statistical information in the third state (step S165). That is, in the case where the location included in the travel history information 30b is not any of a guide location, a stop candidate, and a guide location candidate, the travel history information 30b includes detection information detected at any location, and the state of the statistical information 30a is the third state illustrated in FIG. 2C. Thus, the travel history information 30b includes detection information acquired by the vehicle C for which setting has been made so as not to provide guidance on a guide event or the vehicle C for which setting has been made so as to provide guidance on a guide event. Thus, the control section 20 adds the detection information included in the travel history information 30b to the statistical information in the third state.

Next, through processing performed by the stored information management section 21c, the control section 20 determines whether or not the number of acquired pieces of detection information in the third state is equal to or more than the registration threshold (step S170). That is, the control section 20 references the statistical information 30a on the guide location candidate in the third state, specifies the number of acquired pieces of detection information, and compares the specified number with the registration threshold. In the case where it is determined in step S170 that the number of acquired pieces of detection information in the third state is equal to or more than the registration threshold, through processing performed by the stored information management section 21c, the control section 20 sets the location of detection of a guide event, which has been correlated with the detection information in the travel history information 30b, to a guide location candidate (step S175). That is, the control section 20 generates statistical information 30a correlated with information indicating the location of detection determined as a guide location candidate. In the case where it is not determined in step S170 that the number of acquired pieces of detection information in the third state is equal to or more than the registration threshold, through processing performed by the stored information management section 21c, the control section 20 skips step S175. That is, in the embodiment, a condition under which the location of detection of a guide event should be set to a guide location candidate is prescribed using the number of acquired pieces of detection information in the third state. The registration threshold may be decided in advance as the number of acquired pieces with which the location of detection should be set to a guide location candidate. The registration threshold is prescribed in advance such that it is estimated with a predetermined accuracy that the cause of guidance on a guide event occurs in the case where the number of acquired pieces is equal to or more than the registration threshold. In the embodiment, non-detection information is not acquired in the third state. Therefore, it is determined whether or not the location of detection should be set to a guide location candidate in accordance with the number of acquired pieces rather than the acquisition rate.

(3-2) Acquisition Condition Transmission Processing

Next, acquisition condition transmission processing will be described in detail. The acquisition condition transmission processing illustrated in FIG. 4A is executed in the case where the vehicle C sends an acquisition request for an acquisition condition to the drive assist system 10. In the acquisition condition transmission processing, the control section 20 receives the acquisition request for an acquisition condition via the communication section 22 (step S200). That is, when the vehicle C transmits an acquisition request for an acquisition condition, the vehicle C transmits the acquisition request with the addition of information indicating the current location of the vehicle C. Thus, the control section 20 receives the acquisition request to specify the current location of the vehicle C.

Next, through processing performed by the event information acquisition section 21a, the control section 20 searches for a guide location, a guide location candidate, or a stop candidate around the current location of the vehicle C (step S205). That is, the control section 20 performs processing for searching the statistical information 30a using the current location of the vehicle C, which is specified using the acquisition request in step S200, as a key to specify from the statistical information 30a a guide location, a guide location candidate, or a stop candidate that is present within a predetermined distance from the current location of the vehicle C.

Next, through processing performed by the event information acquisition section 21a, the control section 20 determines whether or not there is present a guide location, a guide location candidate, or a stop candidate around the current location of the vehicle C (step S210). In the case where it is determined in step S210 that there is present a guide location, a guide location candidate, or a stop candidate around the current location of the vehicle C, processing for deciding an acquisition condition is executed in and after step S212. In the processing, one of such locations is used as an object to be processed for deciding an acquisition condition.

In step S212, through processing performed by the event information acquisition section 21a, the control section 20 determines whether or not the location to be processed is a guide location candidate or a stop candidate (step S212). In the case where it is determined in step S212 that the location to be processed is a guide location candidate or a stop candidate, step S215 and the subsequent steps are executed. In the case where it is not determined in step S212 that the location to be processed is a guide location candidate or a stop candidate, on the other hand, the location to be processed is a guide location, and steps S215 to S225 are skipped to execute step S230 and the subsequent steps.

In step S215, through processing performed by the event information acquisition section 21a, the control section 20 acquires a state multiplier A for the detection information that matches the state of the statistical information. In the embodiment, the state multiplier A is a constant decided in advance in accordance with the state of the statistical information 30a, and is a value for setting the acquisition proportion of detection information and non-detection information so as to depend on the state of the statistical information 30a. That is, in the embodiment, the acquisition proportion for a case where detection information is acquired from all the detection vehicles C that detected a guide event is set to 1, and the acquisition proportion for a case where detection information is not acquired from the detection vehicles C is set to 0, so that the acquisition proportion is adjustable in the range of 0 to 1. Alternatively, the acquisition proportion for a case where non-detection information is acquired from all the non-detection vehicles C that did not detect a guide event is set to 1, and the acquisition proportion for a case where non-detection information is not acquired from the non-detection vehicles C is set to 0, so that the acquisition proportion is adjustable in the range of 0 to 1.

The state multiplier A is a value that decides the acquisition proportion which is represented by the value of 1/A. In the embodiment, the acquisition proportion is decided for each of the states of the statistical information 30a, e.g. A=2 for the second state and the fourth state. Thus, the control section 20 acquires the acquisition proportion correlated with the second state in the case where the location to be processed is a stop candidate, and acquires the acquisition proportion correlated with the fourth state in the case where the location to be processed is a guide location candidate.

Next, through processing performed by the event information acquisition section 21a, the control section 20 acquires an event multiplier B that matches the guide event (steps S220). The event multiplier is a value decided in advance for each guide event, and is a numerical value that is more than 1 and that is set so as to become smaller as the order of priority decided in advance for each guide event is higher. In the embodiment, reverse travel and abrupt braking as a guide event are correlated with 1 and 5, respectively, with reverse travel being higher in order of priority than abrupt braking.

Next, through processing performed by the event information acquisition section 21a, the control section 20 sets the acquisition proportion of detection information for the location to be processed to 1/(AB) (step S225). That is, the control section 20 correlates information indicating the acquisition proportion with information indicating the location to be processed and generates information indicating the acquisition condition for the location to be processed for each guide event. In the embodiment, the event multiplier B for reverse travel is 1, and the event multiplier B for abrupt braking is 5. Therefore, if the state multiplier A is 2, the acquisition condition for reverse travel is 1/2, and the acquisition condition for abrupt braking is 1/10.

In steps S230 to S240, processing that is substantially similar to the processing in steps S215 to S225 is executed for non-detection information. It should be noted, however, that the processing in step S230 to S240 is executed both in the case where the location to be processed is a guide location and in the case where the location to be processed is a guide location candidate or a stop candidate. Therefore, in step S230, the state multiplier A for the non-detection information is acquired in accordance with the state of the statistical information 30a. That is, the statistical information 30a is in the first state in the case where the location to be processed is a guide location, the statistical information 30a is in the second state in the case where the location to be processed is a guide location candidate, the statistical information 30a is in the fourth state in the case where the location to be processed is a stop candidate, and the control section 20 acquires a state multiplier A that matches each of the states.

In the embodiment, as described above, the acquisition proportion is decided as the product of the reciprocal of the state multiplier A and the reciprocal of the event multiplier B. Thus, the acquisition proportion depends on the state (first to fourth states) of the statistical information 30a, and detection information is acquired from the detection vehicle C at a higher proportion as the order of priority decided in advance for each guide event is higher. That is, in the case where there are a plurality of guide events, the importance of provision of guidance may differ among the guide events. Thus, in the embodiment, the order of priority that matches the importance is decided in advance, and detection information is acquired from the detection vehicle C at a higher proportion as the order of priority is higher. In addition, information is acquired at a higher proportion as the order of priority decided in advance for each guide event is higher.

When step S240 is executed, the processing in and after step S210 is executed with the location which has so far been the location to be processed excluded from objects to be processed. That is, in the case where step S210 is executed again, if there is a location that is a guide location, a guide location candidate, or a stop candidate present around the current location of the vehicle C and that has not been the location to be processed, it is determined in step S210 that there is present a guide location, a guide location candidate, or a stop candidate around the current location of the vehicle C.

In the case where it is not determined in step S210 that there is present a guide location, a guide location candidate, or a stop candidate around the current location of the vehicle C, through processing performed by the event information acquisition section 21a, the control section 20 acquires an event multiplier B that matches the guide event (step S245). Step S245 is similar to steps S220 and S235. Next, through processing performed by the event information acquisition section 21a, the control section 20 sets the acquisition proportion of detection information for any location to 1/B (step S250). That is, the control section 20 determines the proportion of detection information acquired from the vehicle C in the case where a guide event is detected at any location other than a guide location, a guide location candidate, and a stop candidate as 1/B, and correlates information indicating the acquisition proportion with information indicating any location to generate information indicating the acquisition condition for any location for each guide event. In the embodiment, the event multiplier B for reverse travel is 1, and the event multiplier B for abrupt braking is 5. Therefore, the acquisition condition for reverse travel is 1/1, and the acquisition condition for abrupt braking is 1/5.

Next, through processing performed by the event information acquisition section 21a, the control section 20 transmits the acquisition condition to the vehicle C (step S255). That is, the control section 20 correlates information indicating the position of a guide location, a guide location candidate, or a stop candidate with information indicating the acquisition proportion set in steps S225 and S240. In addition, the control section 20 correlates information indicating any location with information indicating the acquisition proportion set in step S250. The control section 20 then transmits the obtained information to the vehicle C as the acquisition condition. In the vehicle C, the travel history information 300b including detection information or non-detection information is transmitted to the drive assist system 10 in accordance with the acquisition condition (which will be discussed in detail later).

(3-3) Guide Information Transmission Processing

Next, guide information transmission processing will be described in detail. The guide information transmission processing illustrated in FIG. 4B is executed in the case where the vehicle C sends an acquisition request for a guide location to the drive assist system 10. The guide information transmission processing is executed by the guide information transmission section 21d of the control section 20. In the guide information transmission processing, the control section 20 receives the acquisition request for a guide location via the communication section 22 (step S300). That is, when the vehicle C transmits an acquisition request for a guide location, the vehicle C transmits the acquisition request with the addition of information indicating the current location of the vehicle C. Thus, the control section 20 receives the acquisition request to specify the current location of the vehicle C.

Next, the control section 20 searches for a guide location, a guide location candidate, or a stop candidate around the current location of the vehicle C (step S305). That is, the control section 20 performs processing for searching the statistical information 30a using the current location of the vehicle C, which is specified using the acquisition request in step S300, as a key to specify from the statistical information 30a a guide location, a guide location candidate, or a stop candidate that is present within a predetermined distance from the current location of the vehicle C.

Next, the control section 20 determines whether or not there is present a guide location, a guide location candidate, or a stop candidate around the current location of the vehicle C (step S310). In the case where it is not determined in step S310 that there is present a guide location, a guide location candidate, or a stop candidate around the current location of the vehicle C, the control section 20 ends the guide information transmission processing. In the case where it is determined in step S310 that there is present a guide location, a guide location candidate, or a stop candidate around the current location of the vehicle C, on the other hand, the control section 20 generates information indicating the location and an event (step S315). That is, the control section 20 extracts from the statistical information 30a information correlated with the guide location, the guide location candidate, or the stop candidate that is present within a predetermined distance from the current location of the vehicle C, and generates information obtained by correlating information indicating the position of the location with information indicating a guide event. In the case where the location is a guide location or a stop candidate, the generated information is guide information indicating the guide location and a guide event.

Next, the control section 20 transmits the information generated in step S315 to the vehicle C via the communication section 22 (step S320). When the vehicle C receives the information, the vehicle C is provided with guidance on the guide event in the case where the guide location indicated by the information is present ahead. As a result, it is possible to reduce the possibility that the guide event will be caused to recur by the driver of the vehicle C.

(4) Guide Processing

Figure 5:
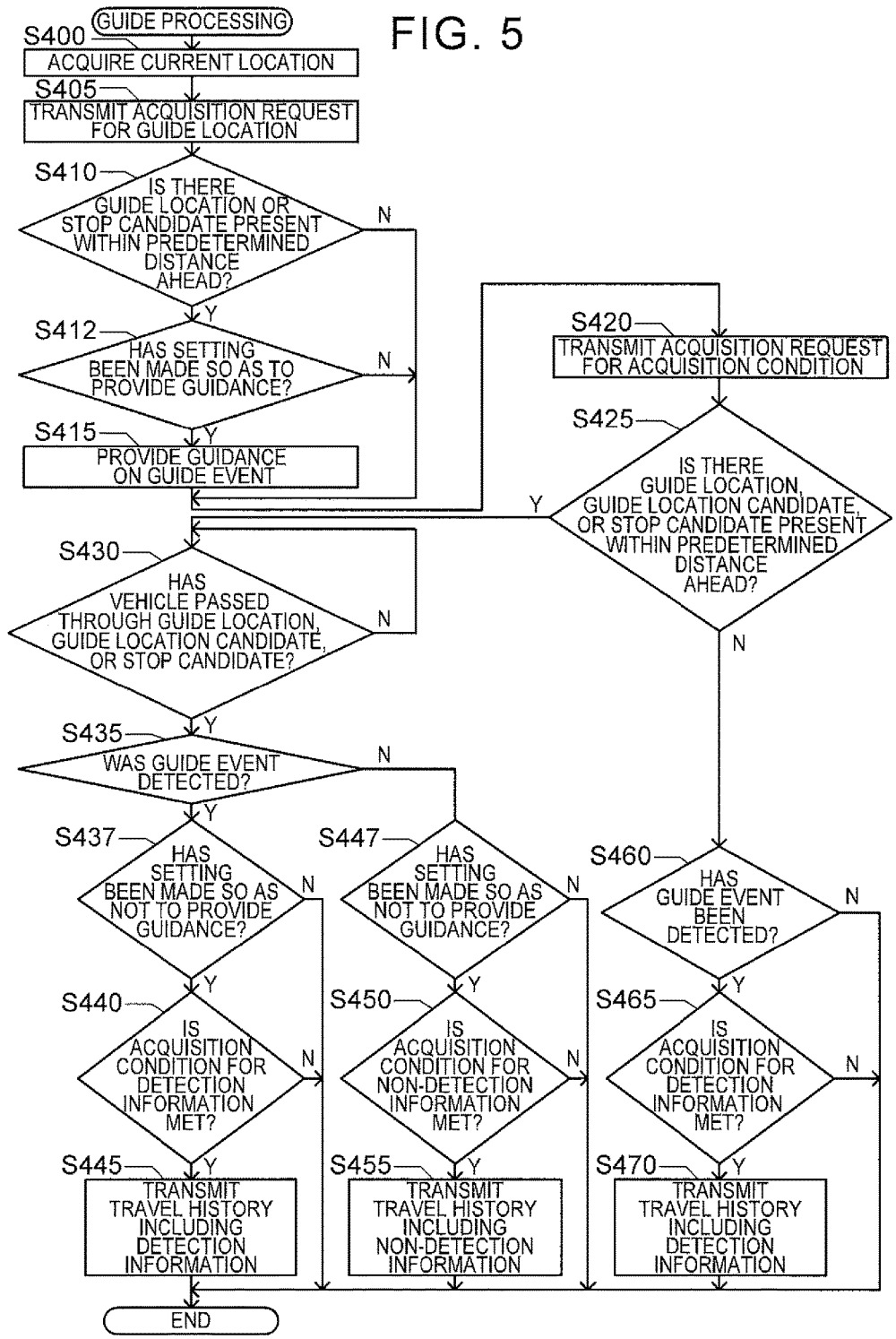
FIG. 5 is a flowchart of guide processing.

Next, guide processing will be described in detail. FIG. 5 is a flowchart illustrating the guide processing. The guide processing is executed by the control section 200 of the vehicle C at intervals of a predetermined period (e.g. 100 ms) through processing performed by the navigation program 210.

In the guide processing, the control section 200 first acquires the current location (step S400). That is, the control section 200 acquires the current location of the vehicle C on the basis of the signals output from the GPS reception section 410, the vehicle speed sensor 420, and the gyro sensor 430. Next, the control section 200 transmits an acquisition request for a guide location (step S405). That is, the control section 200 transmits an acquisition request for a guide location along with information indicating the current location of the vehicle C via the communication section 220.

When the acquisition request for a guide location is transmitted, the control section 20 of the drive assist system 10 transmits information indicating a location and an event through the guide information transmission processing illustrated in FIG. 4B. The control section 200 of the vehicle C receives the information indicating the location and the event via the communication section 220, and stores the received information in the storage medium 300 as guide information 300c. The control section 200 determines, on the basis of the guide information 300c, whether or not there is present a guide location or a stop candidate within a predetermined distance ahead of the vehicle C (step S410). That is, the control section 200 references the map information 300a to determine whether or not there is present the guide location or the stop candidate indicated by the guide information 300c within a predetermined distance ahead of the vehicle C on a road that is present ahead of the current location acquired in step S400.

In the case where it is determined in step S410 that there is present a guide location or a stop candidate within a predetermined distance ahead of the vehicle C, the control section 200 determines whether or not setting has been made so as to provide guidance (step S412). That is, the control section 200 determines whether or not the setting made in advance by the user is setting made so as to provide guidance on a guide event. In the case where it is determined in step S412 that setting has been made so as to provide guidance, the control section 200 provides guidance on the guide event (step S415). That is, the control section 200 outputs, to the user I/F section 450, a control signal for providing guidance on a guide event as the guide location or the stop candidate indicated by the guide information 300c. As a result, guidance on the guide event is provided from the user I/F section 450. In the case where it is not determined in step S410 that there is present a guide location or a stop candidate within a predetermined distance ahead of the vehicle C, or in the case where it is not determined in step S412 that setting has been made so as to provide guidance, on the other hand, the control section 200 skips step S415.

Next, the control section 200 transmits an acquisition request for an acquisition condition (step S420). That is, the control section 200 transmits an acquisition request for an acquisition condition along with information indicating the current location of the vehicle C via the communication section 220. When an acquisition request for an acquisition condition is transmitted, the control section 20 of the drive assist system 10 transmits an acquisition condition through the acquisition condition transmission processing illustrated in FIG. 4A. The control section 200 of the vehicle C receives the acquisition condition via the communication section 220, and specifies a guide location, a guide location candidate, or a stop candidate correlated with the acquisition condition.

Next, the control section 200 determines whether or not there is present a guide location, a guide location candidate, or a stop candidate within a predetermined distance ahead of the vehicle C (step S425). In the case where it is determined in step S425 that there is present a guide location, a guide location candidate, or a stop candidate within a predetermined distance ahead of the vehicle C, the control section 200 stands by until it is determined that the vehicle C has passed through the guide location, the guide location candidate, or the stop candidate (step S430).

In the case where it is determined in step S430 that the vehicle C has passed through the guide location, the guide location candidate, or the stop candidate, the control section 200 determines whether or not a guide event was detected at the guide location, the guide location candidate, or the stop candidate (step S435). That is, the control section 200 determines whether or not abrupt braking was applied on the basis of a history of output from the brake sensor 440 when the vehicle C is present within a range of a prescribed distance from the guide location, the guide location candidate, or the stop candidate, and considers that abrupt braking as a guide event was detected in the case where abrupt braking was applied. In addition, the control section 200 determines whether or not the vehicle C has made reverse travel in a road section on the basis of a history of the current location of the vehicle C when the vehicle C is present within a range of a prescribed distance from the guide location, the guide location candidate, or the stop candidate and the direction of travel in the road section indicated by the map information 300a. In the case where it is determined that the vehicle C made reverse travel, the control section 200 considers that reverse travel as a guide event was detected.

In the case where it is determined in step S435 that a guide event was detected at the guide location, the guide location candidate, or the stop candidate, the vehicle C is determined as a detection vehicle C. In this case, the control section 200 determines whether or not setting has been made so as not to provide guidance on a guide event (step S437). That is, the control section 200 references the storage medium 300 to determine whether or not the setting made in advance by the user is setting made so as not to provide guidance on a guide event. In the case where it is not determined in step S437 that setting has been made so as not to provide guidance on a guide event, the control section 200 skips steps S440 and S445. That is, the control section 200 does not transmit a travel history.

In the case where it is determined in step S437 that setting has been made so as not to provide guidance on a guide event, on the other hand, the control section 200 determines whether or not an acquisition condition for detection information is met (step S440). That is, the control section 200 specifies an acquisition condition for the guide location, the guide location candidate, or the stop candidate, through which it is determined in step S430 the vehicle C has passed, from the acquisition conditions acquired in step S420, and determines whether or not a condition under which detection information should be transmitted from the vehicle C is met. Here, it may be possible to determine whether or not a condition under which detection information should be transmitted is met such that detection information is transmitted at the proportion indicated by the acquisition condition. For example, a configuration in which it is determined whether or not the time of detection of a guide event matches a condition can be assumed. More specifically, it is possible to adopt a configuration in which it is determined that the acquisition condition is met in the case where the second value of the time of detection is a second value that appears at the acquisition proportion as the acquisition condition (e.g. in the case where the acquisition proportion is 1/10, a second value that appears once in ten seconds). As a matter of course, it may be determined whether or not the acquisition condition is met in accordance with other information such as the ID of the navigation terminal 100 of the vehicle C, for example.

In the case where it is determined in step S440 that the acquisition condition for detection information is met, the control section 200 transmits a travel history including detection information (step S445). That is, the control section 200 defines, as detection information, information indicating the guide event determined to be detected in step S435 and information indicating the location at which the guide event was detected, and transmits a travel history including the detection information to the drive assist system 10 via the communication section 220. In the case where it is not determined in step S440 that the acquisition condition for detection information is met, the control section 200 skips step S445.

In the case where it is not determined in step S435 that a guide event is detected at the guide location, the guide location candidate, or the stop candidate, on the other hand, the vehicle C is determined as a non-detection vehicle C. In this case, the control section 200 determines whether or not setting has been made so as not to provide guidance on a guide event (step S447). That is, the control section 200 references the storage medium 300 to determine whether or not the setting made in advance by the user is setting made so as not to provide guidance on a guide event. In the case where it is not determined in step S447 that setting has been made so as not to provide guidance on a guide event, the control section 200 skips steps S440 and S445. That is, the control section 200 does not transmit a travel history.

In the case where it is determined in step S447 that setting has been made so as not to provide guidance on a guide event, the control section 200 determines whether or not an acquisition condition for non-detection information is met (step S450). That is, the control section 200 specifies an acquisition condition for the guide location, the guide location candidate, or the stop candidate, through which it is determined in step S430 the vehicle C has passed, from the acquisition conditions acquired in step S420, and determines whether or not a condition under which non-detection information should be transmitted from the vehicle C is met.

In the case where it is determined in step S450 that the acquisition condition for non-detection information is met, the control section 200 transmits a travel history including non-detection information (step S455). That is, the control section 200 defines, as non-detection information, information indicating the guide event, detection of which was determined in step S435, and information indicating the guide location, the guide location candidate, or the stop candidate, and transmits a travel history including the non-detection information to the drive assist system 10 via the communication section 220. In the case where it is not determined in step S450 that the acquisition condition for non-detection information is met, the control section 200 skips step S455.

In the case where it is not determined in step S425 that there is present a guide location, a guide location candidate, or a stop candidate within a predetermined distance ahead of the vehicle C, the information to be detected by the vehicle C is detection information for any location. Thus, the control section 200 determines whether or not a guide event has been detected in the range traveled through within a predetermined period for which the guide processing illustrated in FIG. 5 is executed repeatedly (step S460). That is, the control section 200 determines whether or not abrupt braking or reverse travel has been detected from the history of output from the brake sensor 440 and the history of the current location of the vehicle C when the vehicle C is present within the range traveled through within the predetermined period.

In the case where it is determined in step S460 that a guide event is detected in the range traveled through within the predetermined period, the vehicle C is determined as a detection vehicle C. In this case, the control section 200 determines whether or not an acquisition condition for detection information is met (step S465). That is, the control section 200 specifies an acquisition condition for detection information for any location from the acquisition conditions acquired in step S420, and determines whether or not a condition under which detection information should be transmitted from the vehicle C is met.

In the case where it is determined in step S465 that the acquisition condition for detection information is met, the control section 200 transmits a travel history including detection information (step S470). That is, the control section 200 defines, as detection information, information indicating the guide event determined to be detected in step S460 and information indicating the location at which the guide event was detected, and transmits a travel history including the detection information to the drive assist system 10 via the communication section 220. In the case where it is not determined in step S465 that the acquisition condition for detection information is met, the control section 200 skips step S470.

(5) Other Embodiments

The embodiment described above is an example, and a variety of other embodiments can be adopted. Guide location acquisition means may only be able to reference a storage medium to acquire a guide location at which guidance associated with a guide event as a guide target is to be provided. That is, with a guide location at which guidance associated with a guide event as a guide target is to be provided for the vehicle being already specified, the storage medium stores information for specifying the guide target. Thus, the guide location acquisition means may only be able to acquire a guide location on the basis of such information. The guide event as a guide target is an object for which the driver of the vehicle is alarmed so that the guide event will not recur during travel of the vehicle, and is assumed to be various types of events. For example, the guide event is assumed to be a variety of events such as an erroneous drive operation, a drive operation for avoiding a hazard, and unstable behavior of the vehicle induced by the travel environment such as a wind and a road surface.

Occurrence of such an event may only be specified by the vehicle detecting the event, and the location at which the event is detected may only be statistically specified as a guide location. Thus, event information may only be constituted of detection information indicating that an event was detected and non-detection information indicating that an event was not detected at a guide location, and a guide event and a guide location may only be specified by acquiring a travel history including the event information and storing the travel history in the storage medium. Guidance to be provided at a guide location may only be guidance associated with a guide event. A variety of configurations can be adopted besides the configuration in which guidance on a guide event itself is provided as in the embodiment discussed above. For example, in the case where the guide event is an event that needs attention, guidance indicating that the guide location is a location that needs attention may be provided.

Event information acquisition means may only be able to acquire event information indicating whether or not the guide event was detected from a vehicle for which setting can be selectively made so as to or so as not to provide guidance associated with the guide event and for which setting has been made so as not to provide such guidance, and which performed detection processing for the guide event at the guide location. That is, the event information acquisition means may be configured to acquire event information, on the basis of which it is determined to stop provision of guidance associated with a guide event, in accordance with the setting made in the vehicle.

A variety of configurations can be adopted as the configuration for acquiring event information in accordance with the setting made in the vehicle. For example, event information may be transmitted from the vehicle along with information indicating whether or not setting has been made so as not to provide guidance associated with a guide event, and the drive assist system may be configured to analyze the event information in the case where information indicating that setting has been made so as not to provide guidance associated with a guide event is included in the event information. The event information may be acquired from a vehicle which performed detection processing for the guide event at the guide location and for which setting has been made so as not to provide guidance, and the event information may not be acquired from a vehicle which performed detection processing for the guide event at the guide location and for which setting has been made so as to provide guidance. With the configuration, a resource (a communication band for communication with the vehicle and a control section for performing detection processing in the vehicle) for acquiring the event information can be simplified.

Stored information management means may only be able to determine whether or not to stop provision of guidance associated with the guide event at the guide location on the basis of the event information, and correct information stored in the storage medium so as to stop provision of guidance associated with the guide event at the guide location for which it is determined to stop provision of guidance associated with the guide event. For example, it is possible to adopt a configuration in which it is determined to stop provision of guidance associated with a guide event at a guide location in the case where it is statistically concluded that the number of occurrences of the guide event or the probability of occurrence of the guide event has been decreased as a result of resolution of the cause of occurrence of the guide event at the guide location on the basis of information indicating that the event was detected or not detected at the guide location.

A variety of configurations can be adopted as the configuration for correcting information stored in the storage medium so as to stop provision of guidance associated with a guide event at a guide location. Information indicating a guide location may be deleted from the storage medium. Alternatively, information stored in the storage medium may be corrected so as to stop provision of guidance associated with a guide event at a guide location by storing, in the storage medium, a flag or the like for controlling execution and stopping of provision of guidance at a guide location in correlation with each guide location, and setting the flag so as to stop providing guidance at a guide location.

Guide information transmission means may only be able to acquire information indicating the guide location for which provision of guidance associated with the guide event has not been stopped and the guide event from the storage medium, and transmit the acquired information to the vehicle. That is, information indicating a guide location and a guide event may be acquired in the drive assist system and transmitted to the vehicle such that guidance on the guide event is provided at the guide location when the vehicle travels through the guide location (or in a range of a predetermined distance from the guide location). In the vehicle, processing for providing guidance associated with a guide event at a guide location is executed on the basis of information indicating the guide location and the guide event when the vehicle travels through the guide location (or in a range of a predetermined distance from the guide location). The processing may be performed using various systems such as a navigation system and an instrument panel, for example.

In the case where the vehicle performed detection processing for the guide event at a location that is not the guide location, the event information acquisition means may acquire the event information from the vehicle irrespective of whether setting has been made so as to provide guidance or setting has been made so as not to provide guidance in the vehicle; and the stored information management means may determine, on the basis of the event information acquired at the location that is not the guide location, whether or not the location is the guide location, and stores the guide location in the storage medium in the case where it is determined that the location is the guide location. That is, guidance on a guide event is not provided at a location that is not specified as a guide location irrespective of whether setting has been made so as to provide guidance or setting has been made so as not to provide guidance for the vehicle. Thus, in this case, event information is acquired regardless of the setting of the vehicle, and it is determined on the basis of the event information whether or not the location is a guide location.

Furthermore, the technique for determining whether or not provision of guidance associated with a guide event at a guide location is stopped on the basis of event information acquired from a vehicle for which setting has been made so as not to provide guidance associated with a guide event can be applied as a program or a method. The system, program, and method described above includes various aspects such as those implemented using a single device and those implemented using parts that are common to various members provided in the vehicle. For example, a navigation system, travel history information management system, method, and program that include the device described above can be provided. Various changes may be made. For example, some units may be implemented using software, and the others may be implemented using hardware. Furthermore, the inventive principles may be implemented as a storage medium for a program that controls the device. As a matter of course, the storage medium for the software may totally equally be a magnetic storage medium, a magneto-optical storage medium, or any storage medium that may be developed in the future.

The invention claimed is:
1. A drive assist system comprising:
a wireless communication circuit;
a memory that stores guide locations where vehicle guidance associated with a vehicle guidance event is to be provided;
a processor programed to:
    access the memory to acquire a guide location;
    acquire event information indicating whether the vehicle guidance event associated with the acquired guide location was detected from a vehicle which:

can be selectively set (i) so as to provide guidance associated with the vehicle guidance event, or (ii) so as to not provide guidance associated with the vehicle guidance event;

has been set so as not to provide the guidance associated with the vehicle guidance event; and performed detection processing for the vehicle guidance event at the acquired guide location;

determine whether to stop provision of the vehicle guidance associated with the vehicle guidance event at the acquired guide location to other vehicles based on the acquired event information;

in response to a determination to stop the provision of the vehicle guidance associated with the vehicle guidance event at the guide location to other vehicles, update the memory by deleting the acquired guide location from the memory so as to stop the provision of the vehicle guidance associated with the vehicle guide event at the acquired guide location; and in response to a vehicle guidance event request from one of the other vehicles, transmit via the wireless communication circuit, a response to the vehicle guidance event request based on the updated memory.

2. The drive assist system according to claim 1, wherein the processor is programmed to:

receive, via the wireless communication circuit, candidate event information from the vehicle for a candidate vehicle guidance event at a candidate guide location when the vehicle is set so as not to provide guidance for the candidate vehicle guidance event; and not receive the candidate event information from the vehicle when the vehicle is set so as to provide guidance for the candidate vehicle guidance event.

3. The drive assist system according to claim 2, wherein the processor is programmed to:

when the vehicle performs detection processing for the candidate vehicle guidance event at a candidate location that is not a stored guide location, acquire the candidate event information from the vehicle irrespective of whether the vehicle is set so as to provide guidance or so as not to provide guidance for the candidate vehicle guidance event; and determine whether the candidate location corresponds to a stored guide location; and store the guide location in the memory when it is determined that the candidate location is corresponds to a stored guide location.

4. The drive assist system according to claim 2, wherein the processor is programmed to:

acquire, via the wireless communication circuit, a travel history from a plurality of vehicles to store the travel history in the memory; and acquire the event information on the basis of the travel history.

5. The drive assist system according to claim 3, wherein the processor is programmed to:

acquire, via the wireless communication circuit, a travel history from a plurality of vehicles to store the travel history in the memory; and acquire the event information on the basis of the travel history.

6. The drive assist system according to claim 1, wherein the processor is programmed to:

acquire, via the wireless communication circuit, a travel history from a plurality of vehicles to store the travel history in the memory; and acquire the event information on the basis of the travel history.

7. A drive assist method comprising:

accessing, with a processor, a memory that stores guide locations where vehicle guidance associated with a vehicle guidance event is to be provided;

acquiring, with the processor, a stored guide location;

acquiring, with the processor, event information indicating whether the vehicle guidance event associated with the acquired guide location was detected from a vehicle which:

can be selectively set (i) so as to provide guidance associated with the vehicle guidance event, or (ii) so as to not provide guidance associated with the vehicle guidance event;

has been set so as not to provide the guidance associated with the vehicle guidance event; and performed detection processing for the vehicle guidance event at the acquired guide location;

determining, with the processor, whether to stop provision of the vehicle guidance associated with the vehicle guidance event at the acquired guide location to other vehicles based on the acquired event information;

in response to a determination to stop the provision of the vehicle guidance associated with the vehicle guidance event at the guide location to other vehicles, updating, with the processor, the memory by deleting the acquired guide location from the memory so as to stop the provision of the vehicle guidance associated with the vehicle guide event at the acquired guide location; and in response to a vehicle guidance event request from one of the other vehicles, transmitting, via a wireless communication circuit, a response to the vehicle guidance event request based on the updated memory.

8. A computer-readable storage medium storing a computer-executable drive assist program, the program comprising:

instructions for accessing a memory that stores guide locations where vehicle guidance associated with a vehicle guidance event is to be provided;

instructions for acquiring a stored guide location;

instructions for acquiring event information indicating whether the vehicle guidance event associated with the acquired guide location was detected from a vehicle which:

can be selectively set (i) so as to provide guidance associated with the vehicle guidance event, or (ii) so as to not provide guidance associated with the vehicle guidance event;

has been set so as not to provide the guidance associated with the vehicle guidance event; and performed detection processing for the vehicle guidance event at the acquired guide location;

instructions for determining whether to stop provision of the vehicle guidance associated with the vehicle guidance event at the acquired guide location to other vehicles based on the acquired event information;

instructions for, in response to a determination to stop the provision of the vehicle guidance associated with the vehicle guidance event at the guide location to other vehicles, updating the memory by deleting the acquired guide location from the memory so as to stop the provision of the vehicle guidance associated with the vehicle guide event at the acquired guide location; and
instructions for, in response to a vehicle guidance event request from one of the other vehicles, transmitting, via a wireless communication circuit, a response to the vehicle guidance event request based on the updated memory.

* * * * *